United States Patent [19]

Sundström

[11] Patent Number: 5,016,497
[45] Date of Patent: May 21, 1991

[54] METHOD AND APPARATUS FOR GRINDING TEETH IN A STEEL STRIP TO FORM SAWS

[75] Inventor: Erik Sundström, Sandviken, Sweden

[73] Assignee: Sandvik AB, Sandviken, Sweden

[21] Appl. No.: 443,181

[22] Filed: Nov. 30, 1989

[30] Foreign Application Priority Data

Nov. 30, 1988 [SE] Sweden .................... 8804335

[51] Int. Cl.⁵ .............................. B23D 63/12
[52] U.S. Cl. ...................... 76/25.1; 76/112; 76/37; 51/33 R; 51/74 BS; 409/173
[58] Field of Search ............. 76/112, 25.1, 37, 44, 76/45, 40, 41; 51/33 R, 33 HK, 74 BS; 409/173, 197, 198

[56] References Cited

U.S. PATENT DOCUMENTS

| | | | |
|---|---|---|---|
| 1,372,738 | 3/1921 | Bjornberg | 76/38 |
| 2,662,424 | 12/1953 | Smal | 76/40 |
| 4,434,685 | 3/1984 | Junker | 76/112 |
| 4,693,145 | 9/1987 | Gustavsson | 76/25.1 |

FOREIGN PATENT DOCUMENTS 3432894 3/1986 Fed. Rep. of Germany .
455384 7/1988 Sweden .

*Primary Examiner*—Roscoe V. Parker
*Attorney, Agent, or Firm*—Burns, Doane, Swecker & Mathis

[57] ABSTRACT

Saws are made by grinding teeth in an edge of a continuously advanced steel strip. The grinding is performed by abrasive members mounted on a frame which is oscillated in an endless path within a plane parallel to a plane of the strip so that the abrasive members intermittently contact the edge.

13 Claims, 2 Drawing Sheets

METHOD AND APPARATUS FOR GRINDING TEETH IN A STEEL STRIP TO FORM SAWS

BACKGROUND OF THE INVENTION

Related Art

The present invention relates to methods and apparatus for manufacturing saws.

Traditionally, the manufacture of saws, such as bandsaws and straight blades has involved either the punching of tooth gullets in the edge of a single steel strip, or the milling of a plurality of toothed gullets simultaneously in a stack of parallel strips which are clamped together. Those methods have several important disadvantages. Punching as well as milling result in a lack of symmetry between the entry side and the exit side of the milling or punching tooling depending on the chip formation. This leads to external flaws such as rounding and burrs, as well as internal flaws such as micro-cracks and grain deformation. Even after a subsequent deburring, most of the flaws remain which can cause crooked sawing and uneven wear. In the above-described methods, the cross-wise edge is formed where the moving edge of the tooling intersects a previously formed contour of the strip, making it difficult to avoid microcracks and break-outs to the edge, where they are most harmful.

Saws for wood, where the demand for edge sharpness is especially high, are for this reason commonly sharpened after punching by filing or grinding.

Gullets can also be ground, which produces much better edge quality with modern grinding techniques. Disclosed in German Patent 903,884 is an abrasive grinding wheel and a rotary shaft disposed parallel to the steel strip. The wheel oscillates in a circle perpendicular to the plane of the strip to grind one gullet at a time, the strip being fed forwardly between each grinding operation.

According to German Patent 38 04 247, a plurality of tooth gullets are ground or sharpened simultaneously in a strip by a stack of abrasive wheels on a common shaft moving linearly in the plane of the strip.

According to Swedish Patent 455,384, a plurality of teeth are ground simultaneously in a stack of strips clamped together, whereby the abrasive wheel is moved perpendicularly to the plane of the strip during grinding, and the strip stack is moved lengthwise only between the grinding operations.

According to German Patent 43 32 894, a plurality of teeth are milled simultaneously in a stack of a few strips clamped together, where the milling cutter is moved in a line in the plane of the strips during the milling operation, and the package is moved lengthwise both during and between the milling operations in a programmed sequence comprising movements both forwards and backwards. A corresponding method can also be used for grinding.

According to U.S. Pat. No. 2,662,424, a saw can be sharpened by a small diameter abrasive peg or rotary file in a spindle which is perpendicular to the plane of the strip and moves in a closed curve in a plane accurately following the shape of the tooth gullet by means of two cam discs. The saw is fed forwardly between sharpening operations.

Because of the many movements to be started and stopped, the methods mentioned above need much time and suffer from vibration problems. When a stack of strips is used in the process, a large number of strips in the stack is needed for efficient productivity, which makes it difficult to reach the desired precision in clamping. Repeated starting and stopping of the feed mechanism causes rapid wear and deterioration of precision manufacturing.

Methods wherein the strip moves continuously and the abrasive wheel rotates on a fixed shaft have been tried in order to increase productivity and eliminate vibrations. According to U.S. Pat. No. 1,372,738 teeth can be milled in a strip moving continuously in a curved path by a helical cutter. German Patent 30 22 292 discloses that teeth can be ground in a strip moving continuously in a straight path by means of a conically helical abrasive wheel. These methods reach high rates of productivity, but set severe limits for tooth angles and tooth shapes; for example, teeth with varying pitch cannot be produced. Helical cutters and wheels are considerably more expensive to manufacture and maintain than those with rotational symmetry.

None of the methods mentioned above can be used to produce saws with chamfered teeth, and such teeth must as a rule be ground one-by-one with a stepwise longitudinal motion of the strip occurring between grinding operations. Stacks of short saw blades for handsaws can also be ground with chamfered teeth if they are realigned in precision fixtures between each grinding operation, but this is subject to severe restrictions as to tooth shape.

It would be desirable to provide a method and a machine for grinding of saws and similar tools as continuous strips, where the strip is continuously moving and teeth with irregular pitch and chamfers can be produced.

SUMMARY OF THE INVENTION

A saw comprises a steel strip with gullets ground into the edge of the strip, the material remaining between the gullets forming the teeth of the saw, and the flanks of teeth being part of the gullet contour. The gullets can also be formed by removing part of the material through punching, followed by grinding to the final shape. The toothed strip can then be made into loops for use as bandsaws, or cut into shorter pieces for use as straight saw blades for various types of handsaws. Strips with a ground toothed edge are also used as punching knives for tearing lines in cardboard and for cutting of fiber reinforced material.

According to the invention, one or a few steel strips are fed with a continuous linear motion through a grinding machine. The abrasive wheels which will produce the gullets are mounted on a bridge which is movable in relation to the frame of the machine and carries one or more abrasive wheels, which may have individual shafts. The longitudinal direction of the bridge is basically parallel to the motion of the strips. The shafts of the abrasive wheels can have arbitrary directions of orientation, but in the simplest case they are oriented parallel to the longitudinal direction of the bridge.

The motors powering the abrasive wheels can be mounted on the bridge, especially if they are designed with low weight and reduced dimensions. Larger motors are preferably attached to the frame of the machine, with torque transmission to the bridge effected through flexible shafts or toothed belts.

The bridge is made to perform an oscillating movement in an endless path relative to the frame of the machine. Each point of the bridge shall then move in a circular or elliptical path in a plane parallel to the plane of the strip. This motion is achieved by supporting the bridge on two or more shafts perpendicular to the surfaces of the strip provided with eccentrics such as disks or cranks.

Since the motion is circular rotational or a combination of different rotating motions it can be balanced by suitably placed counterweights, the size of which is adjusted to the weight of the bridge and the abrasive wheels.

In the event that the plane of the strip is vertical and its motion horizontal, the bridge is preferably placed above the strip to allow easy exchange of abrasive wheels or of the whole bridge for resharpening or when changing to another tooth shape. If limitations for the vertical extent of the machine or related equipment for handling of the strip so require, the plane of the strip can within the scope of the invention also be made horizontal with the bridge placed to one side of the strip.

Sawteeth without chamfers are produced by arranging the abrasive wheels with their shafts parallel to the motion of the strip and in the plane of the strip. The abrasive wheels are rotationally symmetric with a profile determined by the desired tooth shape. Chamfers on the tips or flanks of the teeth are produced by abrasive wheels having their shafts parallel to the strip but offset to the side. If only a few teeth are to be provided with chamfers, these can also be made with abrasive wheels, abrasive pegs or rotary files having their shafts and spindles at inclined angles to the strip.

If the oscillatory motion of the bridge is circular and the velocity of the strip is adjusted to coincide with the tangential velocity of the bridge at its lowest position, the bridge and the abrasive wheels will move in a cycloid curve relative to points on the strip. When in its lowest position the bridge will be temporarily stationary relative to points on the strip, and its relative motion to and from this position will be vertical. This reduces the down-feed rate of the abrasive wheels when the tooth profile is fully developed and leads automatically to a smooth final grinding. With this mode of operation the abrasive wheel profile will coincide with the toot gullet profile.

The cycloid curve has a rather small slope except near the turning points, and in grinding teeth with steeply sloping flanks, the tooth height must be small compared to the radius of the oscillation. At a rake angle of 30° the tooth height may be equal to this radius, at 20° half the radius, and at 15° a third of the radius. With this mode of working, the radius and the associated longitudinal motion per oscillation need to be large.

In order to produce teeth with steeper flanks or with positive rake angle, it is possible to feed the strip more slowly than the tangential velocity of the bridge, and let the steep or undercut tooth edges be gradually ground by the corners of flat or dish-shaped abrasive wheels, the profile of which need not coincide with the profile of the tooth gullets, but has to be calculated. With this mode of operation only a limited class of tooth shapes can be produced.

Another possibility to produce teeth with steeper slopes than with pure cycloid motion is by letting the bridge oscillate in an elliptic path. In this case the longer axis of the ellipse shall be more or less vertical.

If the longer axis of the ellipse is sloping relative to vertical, it is possible to produce unsymmetric teeth which are steeply sloping or are undercut with positive rake angle on one side only. This is the normal design for bandsaws. With this mode of operation one has a liberty in choosing the tooth profile, and the profile of the abrasive wheel coincides with the tooth gullet, which facilitates sharpening and checking. In this mode the previously mentioned smooth final grinding also occurs through the slow down-feed near the lowest position.

The elliptic path of oscillation of the bridge can be produced by various mechanical devices. It can deviate somewhat from an ellipse in the strict mathematical sense, but that will make it more difficult to eliminate vibrations by balancing. In one such device, the path is determined by one point on a link, one end of which moves in a circle while the other end performs a reciprocating linear motion. The slope and the width of the ellipse can then be varied by changing the slope of the linear motion and the relative position of the point on the link.

In another device the elliptic oscillation is determined by superposition of two rotating motions in opposite directions, where the width of the ellipse is determined by the difference in radius of the two circular motions, and the slope is determined by their relative angle difference.

In circular as well as elliptic oscillation, the ridge must supported in at least two points moving in congruent paths.

In determining the profile of the abrasive wheels, it is necessary to recognize that two surfaces meeting at a tip of a tooth must be ground at different contact instances between the strip and the abrasive wheel in order to get a sharp tip. In general, this means that the total thickness of the abrasive wheels on a shaft will be twice the period of the cycloid curve minus one tooth.

BRIEF DESCRIPTION OF THE DRAWINGS

The objects and advantages of the invention will become apparent from the following preferred embodiments thereof in connection with the accompanying drawings in which like numerals designate like elements, and in which:

FIG. 5 is a perspective view of a drive mechanism for producing the elliptical travel path of FIG. 4.

DETAILED DESCRIPTION OF PREFERRED EMBODIMENTS OF THE INVENTION

Figure 1:
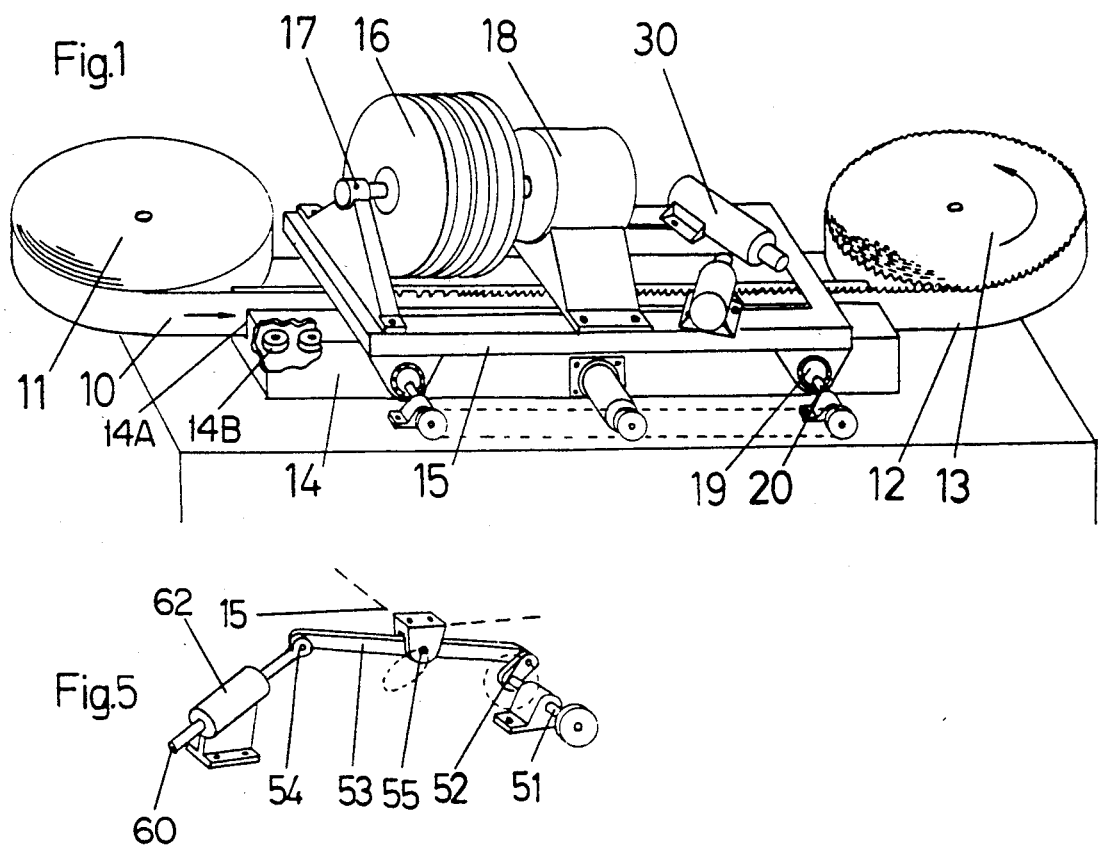
FIG. 1 is a perspective view of a grinding machine according to the present invention with a portion thereof broken away to expose internal feed rolls.

FIG. 1 shows a general view of a steel strip 10 and a bridge 15 including abrasive wheels 16 mounted thereon. The strip 10 is unwound from a coil 11, and is fed continuously through a groove 14A in a supporting block 14. The strip can be fed continuously in the direction of its length in any suitable manner, such as by the use of motor-driven feed rolls 14B disposed in the groove on opposite sides of the strip. The rolls also support the strip during grinding. The completed toothed strip 12 is then wound onto a coil 13. The bridge 15 is located above the strip, and it carries the abrasive wheels 16 along with a motor 18 for rotating a shaft on which the wheels 16 are mounted, and bearings 17 for the shaft. The bridge also carries spindles 30 for grinding side edges or chamfers. The bridge performs an oscillating motion in an endless circular path within a plane parallel to the plane of the strip (the term "parallel" including the case where those planes coincide with another). Corners of the bridge are supported by ball bearings on circular eccentric disks 19 which are fastened to shafts 20. These shafts 20 are rotated synchronously and in a fixed ratio to the feed speed of the feeding device 14, so that each shaft makes one revolution as the strip is fed forward (i.e., to the right in FIG. 1) by a predetermined distance. The strip is fed with constant velocity without interruption.

The feed speed of the feeding device 14 is at most equal to the tangential velocity of the oscillating motion of the bridge 15, and at least half this velocity.

The synchronization between the shafts 20 and the feeding device 14 can be made by purely mechanical means like gears or toothed belts, or by an electronic monitoring of the velocities. Alternatively, the motor for the abrasive wheel can also be mounted on the frame of the machine, powering the abrasive wheel via toothed belts.

Figure 2:
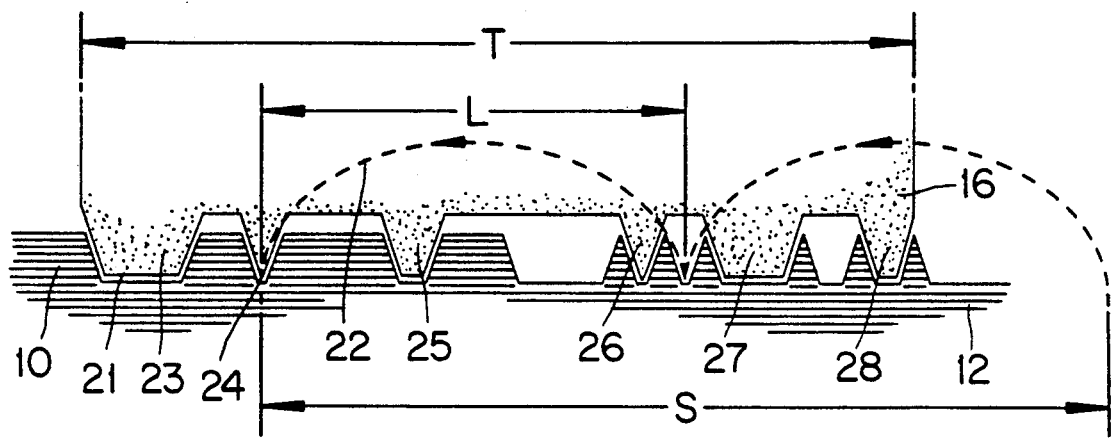
FIG. 2 is a side elevational view of an edge of a strip as it is engaged by abrasive wheels according to the invention, the wheels being carried by a unit oscillating in an endless circular path, the tangential speed of which coinciding with the speed of the strip.

FIG. 2 shows the relation between the strip and the abrasive wheel 16 in the case that the motion of the bridge is circular counterclockwise with a tangential velocity equal to the left-to-right feed speed of the strip whereby a certain tooth profile is produced in the strip. In such a case, each point on the bridge 15 or the abrasive wheel 16, including for example a protruding ridge 24 on the profile 21 of the abrasive wheel, will move in a cycloid path 22 from right-to-left relative to the strip. In this example, the tooth profile which is cut comprises a recurring group of six teeth with different relative spacing. The thickness T of the abrasive wheel 16 in this example is twice the period length L of the cycloid curve 22. Each longitudinal section S of the strip containing the recurring group of teeth will then be touched twice by the abrasive wheel 16. During the first touch, three ridges 23, 24, 25, on the left half of the abrasive wheel will grind three tooth gullets which are not adjacent to each other; during the second touch, three ridges 26, 27, 28 on the right half of the abrasive wheel will grind the remaining gullets.

Figure 3:
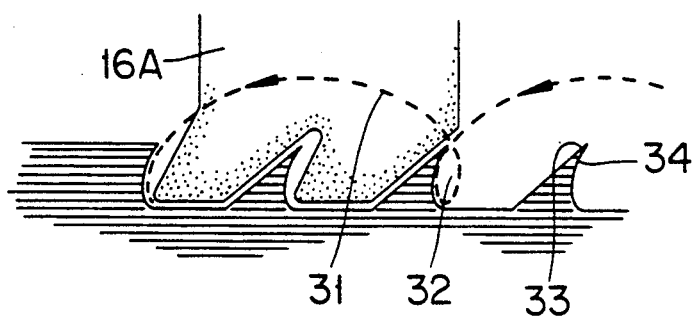
FIG. 3 is a view similar to FIG. 2, wherein the speed of the strip is about 70 percent of the tangential or instantaneous speed of the unit, and the teeth ar formed with a rake angle.

FIG. 3 shows the relation between the strip 10 and an abrasive wheel 16A in a case when the feed speed of the strip is reduced to 70% of the tangential velocity of the oscillating motion, for instance by increasing the radius of oscillation. Relative to points on the strip, a point on the profile of the abrasive wheel will describe a curve 31 from right-to-left with successive curves overlapping to form a small closed loop 32. By refraining from the smooth final grinding which in the case shown in FIG. 2 is produced when the abrasive wheel is in its lowest position, the various parts of the tooth profile can be successively formed during one oscillation period, and more specifically the surfaces 33, 34 which meet in a tooth tip are ground at different instances during the same period. In this case the abrasive wheel need not be thicker than the length of the cycloid period. There is also a possibility to produce teeth with a positive rake angle facing one or two directions. The profile of the abrasive wheel will in this case not coincide with the profile of the tooth gullets, and has to be calculated.

Figure 4:
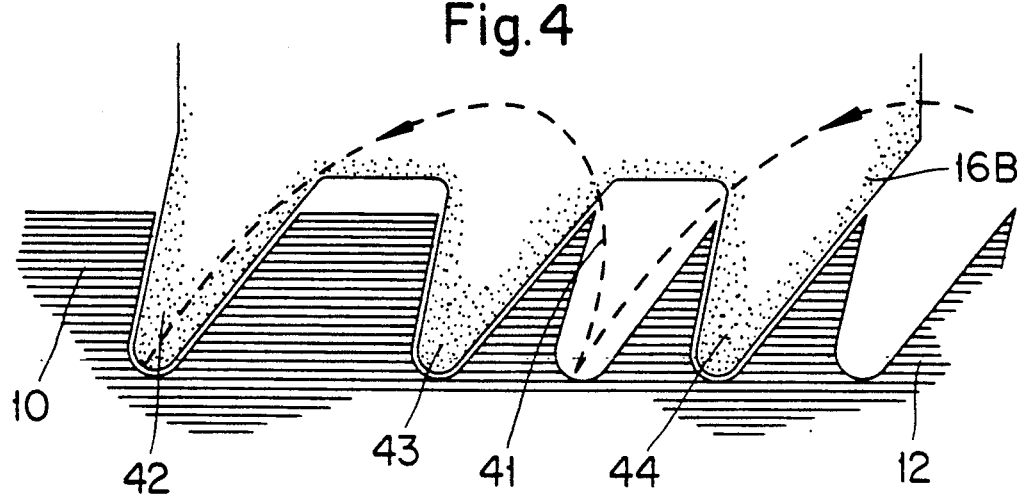
FIG. 4 is a view similar to FIG. 2, wherein the unit is oscillated in an elliptical path to form tall teeth in strip.

FIG. 4 shows the relation between an abrasive wheel 16B and the strip in a case when the oscillating motion is elliptic with a sloping axis, and the feed speed of the strip is equal to the tangential velocity of the bridge in the lowest position of the latter. The height of the ellipse is twice the width, and the slope is 30°. Relative to points on the strip, a point on the profile of the abrasive wheel will describe an unsymmetric curve 41 which is steeper than a cycloid curve. There is shown an example of a tooth profile with three teeth in the length of one period, and the thickness of the abrasive wheel corresponds to twice the period length minus one tooth. During the first touch a certain section of the strip has two tooth gullets 42, 43 produced therein by ridges on the left part of the abrasive wheel, and during the second touch the intermediate gullet 44 is produced by a ridge on the right part of the abrasive wheel. FIG. 4 shows an embodiment with equal tooth spacing, but as in FIG. 2 it is also possible to choose different tooth distances within a recurring group with the same length as the period of the curve 41. With this arrangement it is possible to produce teeth with positive rake angle in one direction, shown in FIG. 4 as 10°.

It is clear from these figures that a circular oscillation with equality of feed speed and tangential velocity according to FIG. 2 is suitable for short teeth with moderately steep flanks. Circular oscillation with reduced feed speed according to FIG. 3 is suitable for various tooth shapes if the flanks with positive rake angle have at least partly a shape coinciding with the loops 32 of the curve 31 of the relative motion. Elliptical oscillation according to FIG. 4 is suitable for tall teeth with steep flanks or positive rake angle in one direction.

FIG. 5 shows one possible type of support for the bridge, which makes the bridge 15 perform an elliptical oscillation. A shaft 51 is journalled in the machine frame and is rotated in a predetermined ratio to the feed speed. Attached to the shaft is an eccentric crank 52 creating a circular motion to one end of a link 53, the second end 54 of which performs a linear motion. That second end 54 is pivotably connected to a rod 60 which is constrained to reciprocate linearly within a fixed hollow sleeve 62. The bridge 15 is supported on points 55 between the ends of the link. These points 55 will perform an elliptical motion, the longer axis of which corresponds to the diameter of the circular motion at the eccentric 52 and has a slope corresponding to the linear motion of the second end 54. The length of the shorter axis depends on the distance between the point 55 and the second end 54, and it becomes shorter when this distance is diminished. The bridge 15 is supported by at least two similar links 53 with the same direction of the linear motion, with the same radius of the circular motion and with synchronized rotation of the shafts 51.

Many other methods produce elliptical motion are conceivable, for instance counter-rotating eccentrics and planetary gears. Likewise, it is inherent in the invention that the bridge can be placed below or to the side of the strip, and that the plane of the strip may be horizontal or sloping.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A method for grinding saw teeth in an edge of an elongated metal strip, comprising the steps of:
   continuously moving said strip in the direction of its length, whereby said strip passes adjacent a grinding unit comprised of a rotary abrasive element, and
   oscillating said unit in an endless path lying within a plane disposed parallel to a plane of said strip, whereby said abrasive element makes intermittent contact with said continuously moving strip to grind said teeth.

2. A method according to claim 1, wherein said unit is oscillated in an endless elliptical path having a first axis extending laterally of said edge and a second axis extending generally in the direction of said edge, said first axis being n shorter than said second axis.

3. A method according to claim 1, wherein said endless path is circular.

4. A method according to claim 1, wherein a speed of said strip is no greater than a speed of said unit when said unit is closest to said strip.

5. A method according to claim 4, wherein said speed of said strip is from 50 to 100 percent that of said unit.

6. Apparatus for grinding teeth in an edge of an elongated metal strip comprising:
   means for continuously moving said strip in the direction of its length,
   a grinding unit comprising a rotary abrasive element, and
   drive means for oscillating said unit in an endless path lying within a plane disposed parallel to a plane of said strip, whereby said abrasive element makes intermittent contact with said continuously moving strip to grind said teeth.

7. Apparatus according to claim 6, wherein said grinding unit comprises a frame on which said abrasive element is mounted, said drive means comprising eccentric means rotatably carried by said frame, and motor means for rotating said eccentric means.

8. Apparatus according to claim 7, wherein said drive means comprises a plurality of rotary shafts oriented parallel to one another and perpendicular to a plane of said strip, said eccentric means comprising two eccentrics mounted in bearings carried by said frame, said eccentrics being rotated by said motor means.

9. Apparatus according to claim 8, wherein said motor means rotates said shafts at a speed which is proportional to a speed of said strip.

10. Apparatus according to claim 8, wherein said frame is supported solely by said eccentric means.

11. Apparatus according to claim 7, wherein said drive means comprises a link carried at a location intermediate its ends by said frame and connected at one end to said eccentric mean and connected at its other end to a linearly reciprocable rod.

12. Apparatus according to claim 6, wherein said abrasive element comprises a plurality of abrasive wheels for cutting said teeth into said edge.

13. Apparatus according to claim 7, wherein said abrasive element comprises a spindle carrying rotary files for sharpening teeth cut by said abrasive wheels.

* * * * *